(12) United States Patent
Yang

(10) Patent No.: US 7,401,828 B2
(45) Date of Patent: Jul. 22, 2008

(54) SUBSTRATE CONVEYANCE DEVICE FOR FABRICATION OF LIQUID CRYSTAL DISPLAY DEVICE

(75) Inventor: Jong Ahn Yang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 156 days.

(21) Appl. No.: 11/299,654

(22) Filed: Dec. 13, 2005

(65) Prior Publication Data

US 2006/0284434 A1 Dec. 21, 2006

(30) Foreign Application Priority Data

Jun. 20, 2005 (KR) .................. 10-2005-0053129

(51) Int. Cl.
*B25J 15/10* (2006.01)
(52) U.S. Cl. .................. 294/119.1; 294/1.1; 414/941
(58) Field of Classification Search ............... 294/1.1, 294/86.4, 103.1, 119.1; 414/935–941
See application file for complete search history.

(56) References Cited

U.S. PATENT DOCUMENTS

| | | | | |
|---|---|---|---|---|
| 4,410,209 A | * | 10/1983 | Trapani | 294/34 |
| 4,968,082 A | * | 11/1990 | Thinlot | 294/119.1 |
| 5,022,695 A | * | 6/1991 | Ayers | 294/88 |
| 5,700,046 A | * | 12/1997 | Van Doren et al. | 294/119.1 |
| 6,092,971 A | * | 7/2000 | Balg et al. | 414/416.03 |
| 6,109,677 A | * | 8/2000 | Anthony | 294/103.1 |
| 6,499,777 B1 | * | 12/2002 | Wang | 294/1.1 |
| 6,540,468 B1 | * | 4/2003 | Blattner et al. | 414/416.08 |
| 6,932,557 B2 | * | 8/2005 | Downs et al. | 414/741 |
| 2003/0035711 A1 | * | 2/2003 | Gilchrist | 414/744.5 |

FOREIGN PATENT DOCUMENTS

JP 2005-116665 4/2005

* cited by examiner

*Primary Examiner*—Dean J Kramer
(74) *Attorney, Agent, or Firm*—McKenna, Long & Aldridge LLP

(57) ABSTRACT

A substrate conveyance device for fabricating a liquid crystal display device is provided. The substrate conveyance device conveys substrates and aligns substrates without using an additional aligning apparatus. The substrate conveyance device includes an arm that forms a body of the substrate conveyance device, a hand and a mover. The hand, that is movable in a first direction, includes a first end coupled with the arm and an upper surface where a substrate is placed on the upper surface. The hand also has a holder which holds a dummy portion which is at an edge of the substrate. The mover is configured to move the hand.

14 Claims, 11 Drawing Sheets

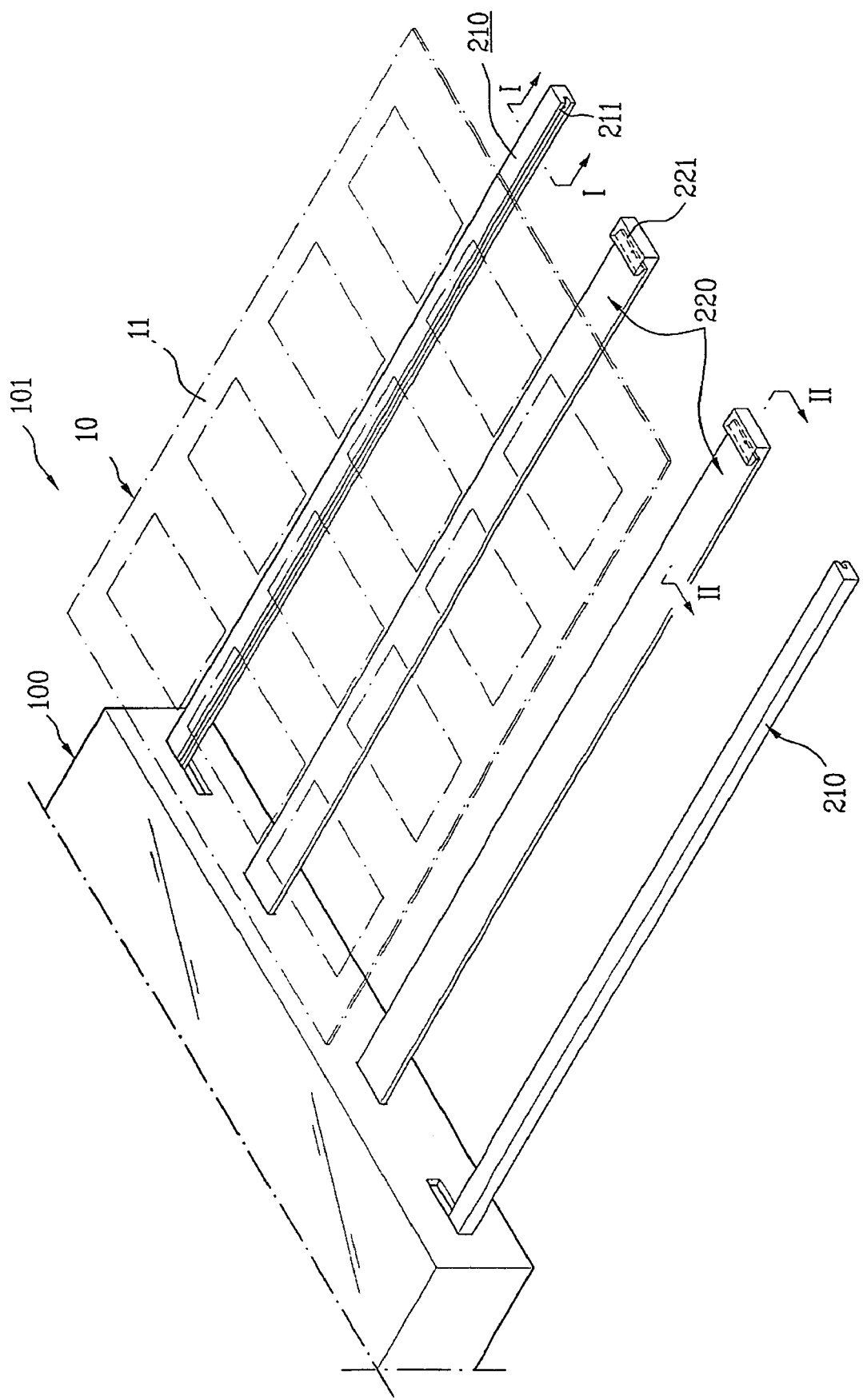

SUBSTRATE CONVEYANCE DEVICE FOR FABRICATION OF LIQUID CRYSTAL DISPLAY DEVICE

CROSS-REFERENCE TO RELATED APPLICATION

This application claims the benefit of Korean Application No. P2005-53129 filed on Jun. 20, 2005, which is hereby incorporated by reference as if fully set forth herein.

BACKGROUND OF THE INVENTION

1. Field of the Invention

The present invention relates to devices for fabricating liquid crystal display devices, and more particularly, to a substrate conveyance device for fabricating a liquid crystal display device, where a substrate conveyance device conveys a substrate of a liquid crystal panel.

2. Discussion of the Related Art

Liquid crystal display (LCD) devices have good picture quality, are thin and light weight, and consume comparatively little power. As such, many mobile display device applications use LCD devices. Besides the mobile display devices, such as monitors for notebook computers, LCD devices are also used in other applications, including television monitors which receive and display a broadcast signal, and desktop computer monitors.

In general, a LCD device has a liquid crystal panel for displaying a picture and a driving unit for applying a driving signal to the liquid crystal panel. Additionally, the LCD device has a pair of substrates bonded together where a liquid crystal layer is injected in a gap between the substrates.

Individual substrates, or bonded substrates having individual substrates bonded together, are conveyed to and from various positions during fabrication with a conveyance device, such as a robot arm.

The robot arm, or the conveyance device, has a plurality of hands for conveying the individual substrates or the bonded substrates, to various positions during fabrication. When the robot arm conveys the substrates to and from various positions, the robot arm has either the individual substrates or the bonded substrates on a surface of each hand of the robot arm.

Furthermore, the related art robot arm has a plurality of projections from the surface of the hand that minimize a contact area between the robot arm and the substrate.

However, projections of the related art robot arm concentrate a load on portions of the individual substrates or the bonded substrates where each of the projections contact the substrates, thereby bending the portions.

Particularly, if the bent portion has a spacer formed thereon for maintaining an appropriate gap between one pair of substrates, the appropriate gap may not be maintained, which may cause a defective orientation of the liquid crystals.

Moreover, the related art conveyance device does not align substrates. Thus, a separate alignment device is required to align bonded substrates when a substrate moves to different positions during a fabrication process. For example, a separate alignment device is required when a substrate is moved to a cutting apparatus that cuts the bonded substrates into unit panels. Consequently, time and costs associated with fabricating LCD devices increase.

SUMMARY OF THE INVENTION

Accordingly, the present invention is directed to a substrate conveyance device for fabricating a liquid crystal display device that substantially obviates one or more problems due to limitations and disadvantages of the related art.

An advantage of the present invention is to provide a substrate conveyance device for fabricating a liquid crystal display device which enables alignment of substrates without using an additional aligning apparatus and conveys substrates.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these advantages and in accordance with the purpose of the invention, as embodied and broadly described herein, a substrate conveyance device for fabricating a liquid crystal display device is disclosed. The substrate conveyance device includes an arm which forms a body of the substrate conveyance device, a first hand and a first mover configured to move the first hand. The first hand, which is movable in a first direction, includes a first end coupled with the arm and an upper surface, wherein a substrate is placed on the upper surface. The first hand also includes a first holder which holds a dummy portion of the substrate which is at an edge of the substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 illustrates a perspective view of a substrate conveyance device in accordance with a first embodiment of the present invention;

DETAILED DESCRIPTION OF THE INVENTION

Reference will now be made in detail to an embodiment of the present invention, example of which is illustrated in the accompanying drawings. Wherever possible, the same reference numbers will be used throughout the drawings to refer to the same or like parts.

FIG. 1 illustrates a perspective view of a substrate conveyance device 101 in accordance with a first embodiment of the present invention.

Figure 4:
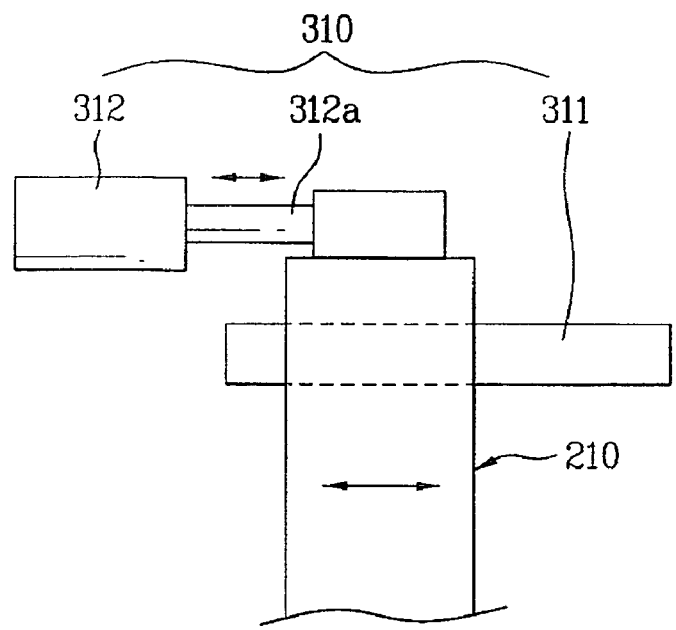
FIG. 4 illustrates a mover unit for an outer hand unit of the substrate conveyance device in accordance with a first embodiment of the present invention.
Figure 5:
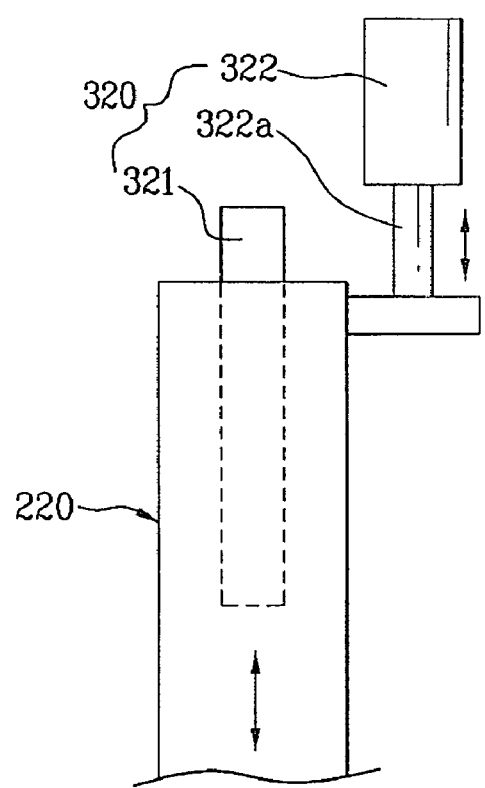
FIG. 5 illustrates a mover unit for an inner hand unit of the substrate conveyance device in accordance with a first embodiment of the present invention.

Referring to FIG. 1, the substrate conveyance device 101 in accordance with a first embodiment of the present invention includes an arm 100, hands 210 and 220, and movers 310 and 320 (FIGS. 4 and 5). The arm 100 forms a body of the substrate conveyance device 101. A separate driving unit (not shown) moves the arm 100 to a position such that a substrate may be placed onto the substrate conveyance device 101. In addition, the driving unit moves the arm 100 to another position such that a substrate may be removed from the substrate conveyance device 101.

As may be seen in FIG. 1, a first end of each of the hands 210 and 220 secures to the arm 100. A second end of the hands 210 and 220 projects outwardly from the arm 100 thereby forming a portion for placing a substrate 10 thereon. Here, the first end of the hands 210 and 220 secured to the arm 100 is movable toward a portion having the substrate 10 placed thereon.

In this embodiment, the substrate conveyance device 101 may include a plurality of the hands 210 and 220. In this embodiment, the substrate conveyance device 101 may have a pair of the hands 210 at an outer portion of the arm 100 thereby forming a pair of outer hands. The substrate conveyance device 101 may also have a pair of the hands 220 between the outer hands 210, thereby forming a pair of inner hands.

The outer hands 210 are movable in a lateral direction such that they move in opposite directions relative to each other. The inner hands 220 are movable in a longitudinal direction.

Furthermore, the substrate conveyance device 101 has holders 211 and 221 at a portion of the hands 210 and 220, respectively. As may be seen in FIG. 1, the holders 211 and 221 are disposed on the hands 210 and 220 where a dummy portion 111 at an edge of the substrate 10 contacts a surface of the hands 210 and 220. Accordingly, the holders 211 and 221 hold the dummy portion 11 of the substrate 10.

Figure 2A:
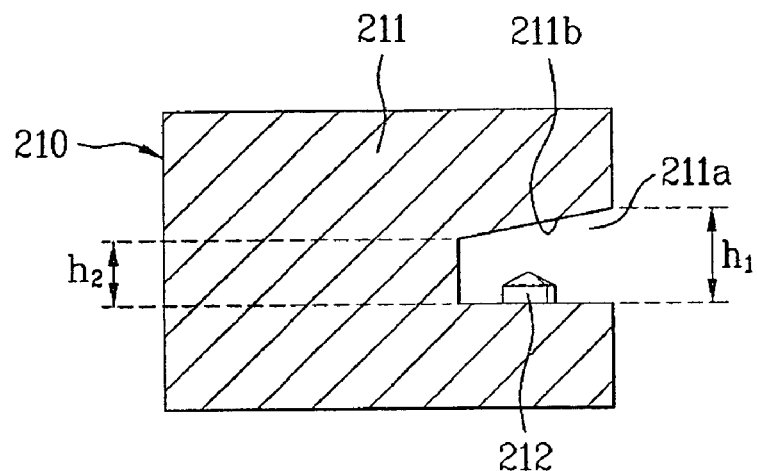
FIG. 2A illustrates a section across a line I-I in FIG. 1 of an outer hand unit of the substrate conveyance device.
Figure 2B:
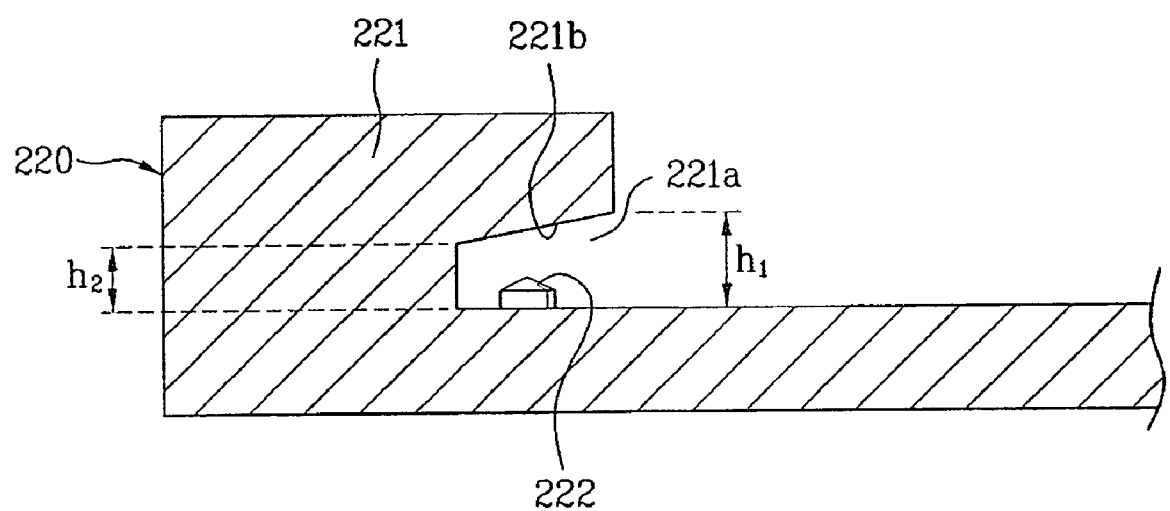
FIG. 2B illustrates a section across a line II-II in FIG. 1 of an inner hand unit of the substrate conveyance device.
Figure 3A:
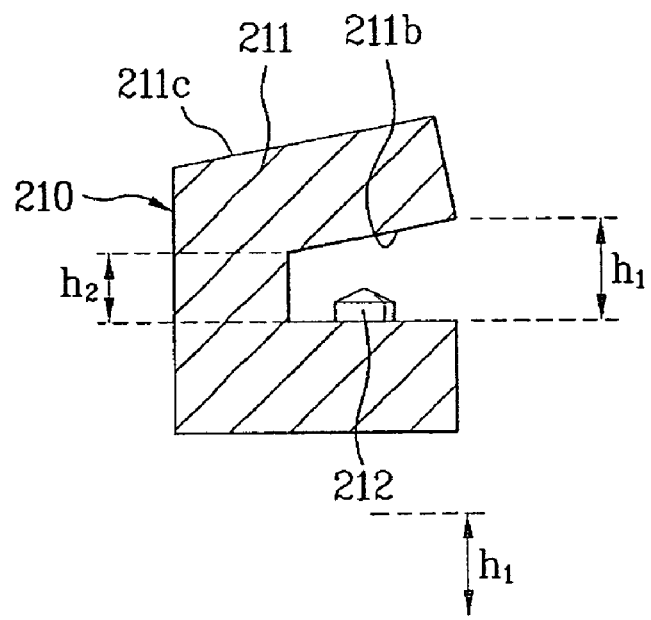
FIG. 3A illustrates an outer hand unit of a substrate conveyance device in accordance with an alternative embodiment of the present invention.
Figure 3B:
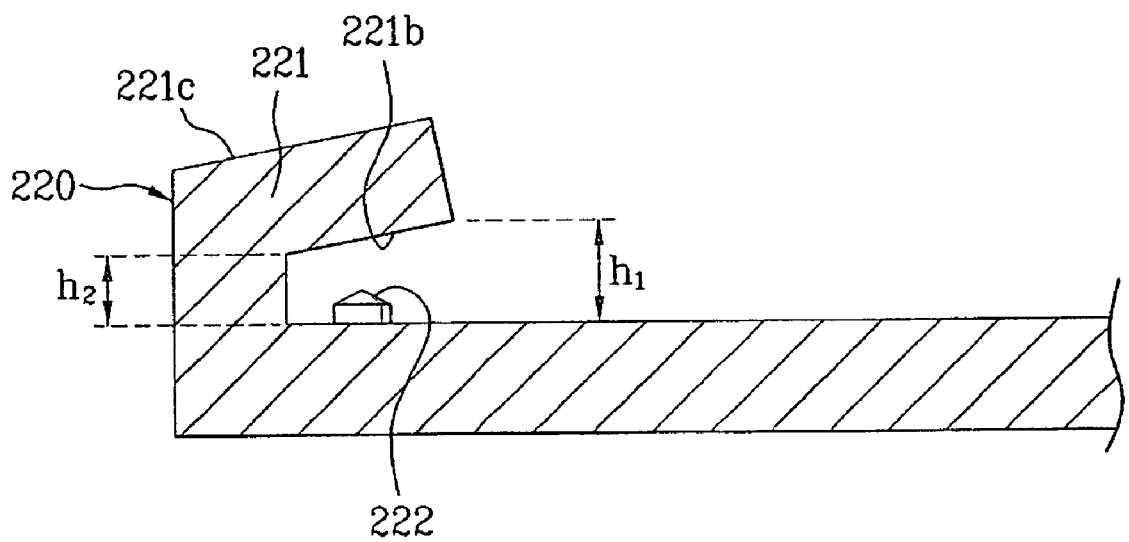
FIG. 3B illustrates an inner hand unit of a substrate conveyance device in accordance with an alternative embodiment of the present invention.

Referring to FIGS. 2A and 2B, the holders 211 and 221 have slots 211a and 221a, respectively, for holding the dummy portion 11 of the substrate 10. It should be noted that in accordance with another embodiment of the present invention, the holder 211 may have a sloped portion 211c, as shown in FIG. 3A. Similarly, in accordance with another embodiment of the present invention, the holder 221 may have a sloped portion 221c, as shown in FIG. 3B.

As may be seen in FIGS. 2A, 2B, 3A, and 3B, the holders 211 and 221 form an opening having widths $h_1$ and $h_2$. In this embodiment, the width $h_1$ is greater than a thickness of a substrate, such as the substrate 10, which is held by the holders 211 and 221. It should be noted that in embodiments where the substrate conveyance device 101 is used to convey bonded substrates, the width $h_1$ is greater than a thickness of the bonded substrate. Furthermore, as may be seen in FIGS. 2A, 2B, 3A, and 3B, the width $h_1$ is greater than the width $h_2$ such that the holders 211 and 221 may hold substrates and bonded substrates having a variety of thicknesses.

In accordance with an embodiment of the present invention, the holders 211 and 221 include sloped surfaces 211b and 221b, respectively. As may be seen in FIGS. 2A, 2B, 3A, and 3B, the sloped surfaces 211b and 221b slope in a downward direction from the width $h_1$ to the width $h_2$. Thus, the sloped surfaces 211b and 221b guide a substrate placed within the holders 211 and 221.

Moreover, the slots 211a and 211b of the holders 211 and 221 open in different directions depending on the orientation of the hands 210 and 220. More specifically, the slots 211a of the holder 211 at the outer hands 210 face each other for holding opposite edges of the substrate 10, as shown in FIG. 1. The slots 221a of the holders 211 at the inner hands 220 face the arm 100 of the substrate conveyance device 101 for holding a front edge of the substrate 10, as shown in FIG. 1.

Though the holders 211 at the outer hands 210 may be formed throughout an entire length thereof, the holders 211 may also be formed only at a portion of the outer hands, or at regular intervals thereof.

Moreover, there may be a plurality of supporting projections 212 and 222 disposed on a surface of the hands 210 and 220, respectively, which support the substrate 10. In this instance, the supporting projections 212 and 222 may be formed on a portion of an upper surface of the hands 210 and 220 where the dummy portion 11 of the substrate 10 is placed thereon. As such, the supporting projections 212 and 222 prevent damage to the substrate.

The movers 310 and 320 of the substrate conveyance device 101 move the hands 210 and 220, respectively.

In this instance, the movers 310 and 320 may be individually provided to each of the hands 210 and 22, for separate movement of the hands 210 and 220. However, it should be noted that an additional link structure (not shown) may be provided for simultaneously moving the hands 210 and 220.

As may be seen in FIGS. 4 and 5, the movers 310 and 320 include guides 311 and 321, respectively, for guiding movement of the hands 210 and 220. The movers 310 and 320 also include actuators 312 and 322 which move the hands 210 and 220.

The guides 311 and 321 are mounted at an end of the hands 210 and 220. The mover 310 includes a plunger 312a disposed between the hand 210 and the actuator 312. Likewise, the mover 321 has a plunger 322a disposed between the hand 220 and the actuator 322.

As shown in FIG. 4, the mover 310 moves the outer hand 210 in a lateral direction. Furthermore, as may be seen in FIG. 5, the mover 320 moves the inner hand 220 in a longitudinal direction.

The operation of the substrate conveyance device in accordance with a first embodiment of the present invention will be described.

Figure 6A:
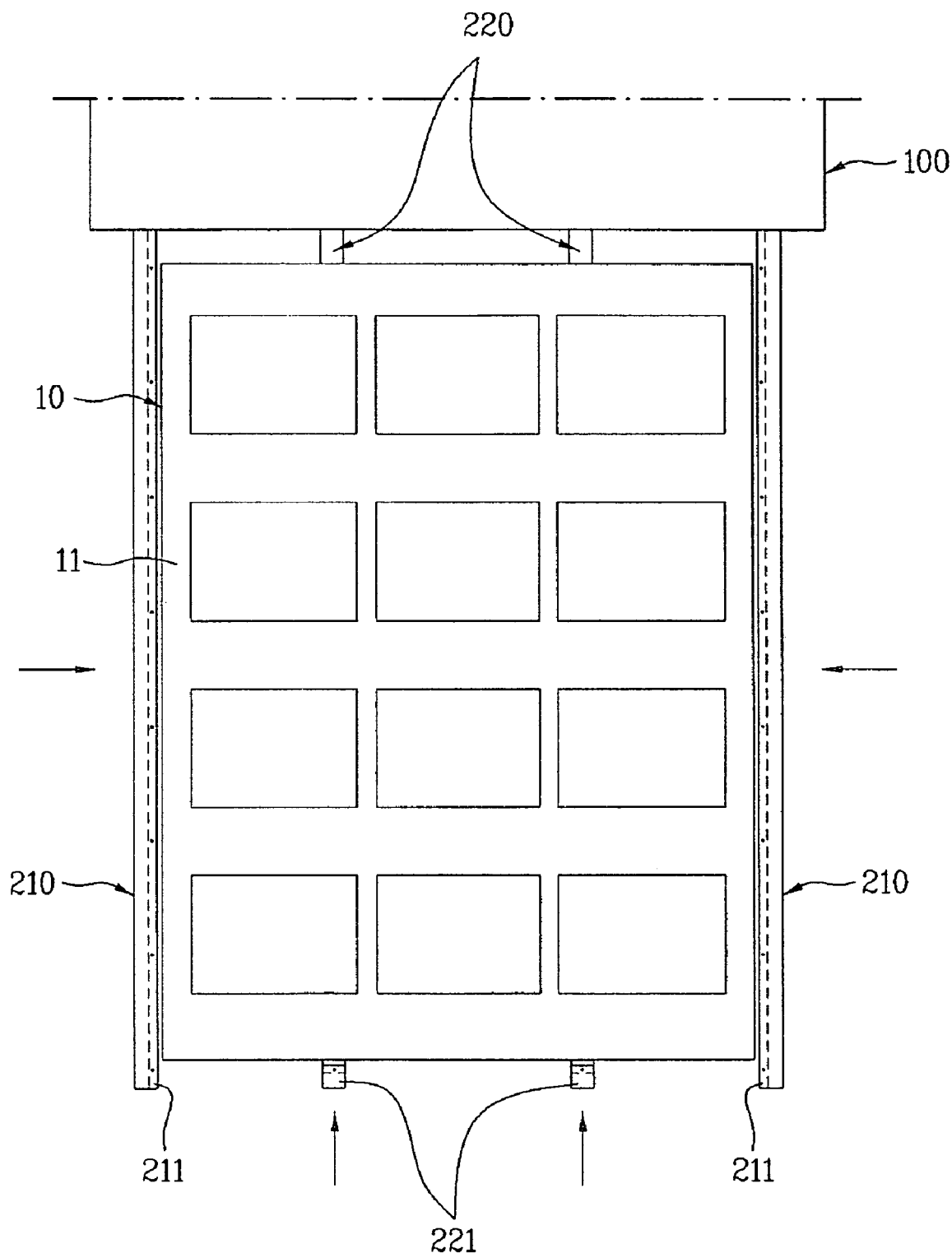
FIG. 6A to 6C illustrate a plan view, a front sectional view, and a side sectional view of the substrate conveyance device in accordance with a first embodiment of the present invention.
Figure 6B:
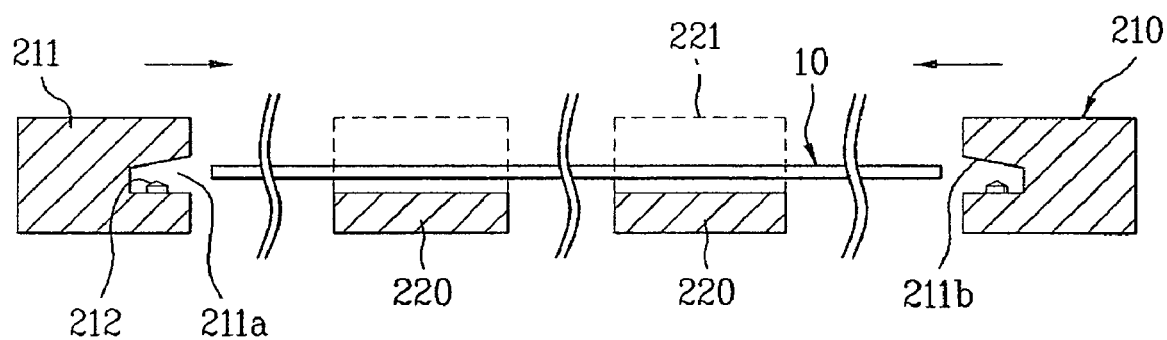
Figure 6C:
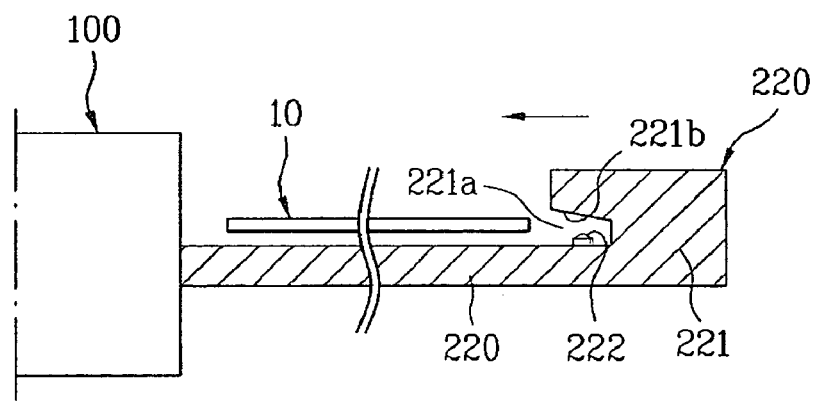

Referring to FIGS. 6A to 6C, the substrate 10 is loaded on the hands 210 and 220 of the substrate conveyance device 101 such that the hands 210 and 220 are positioned at an underside of the substrate 10.

Figure 7A:
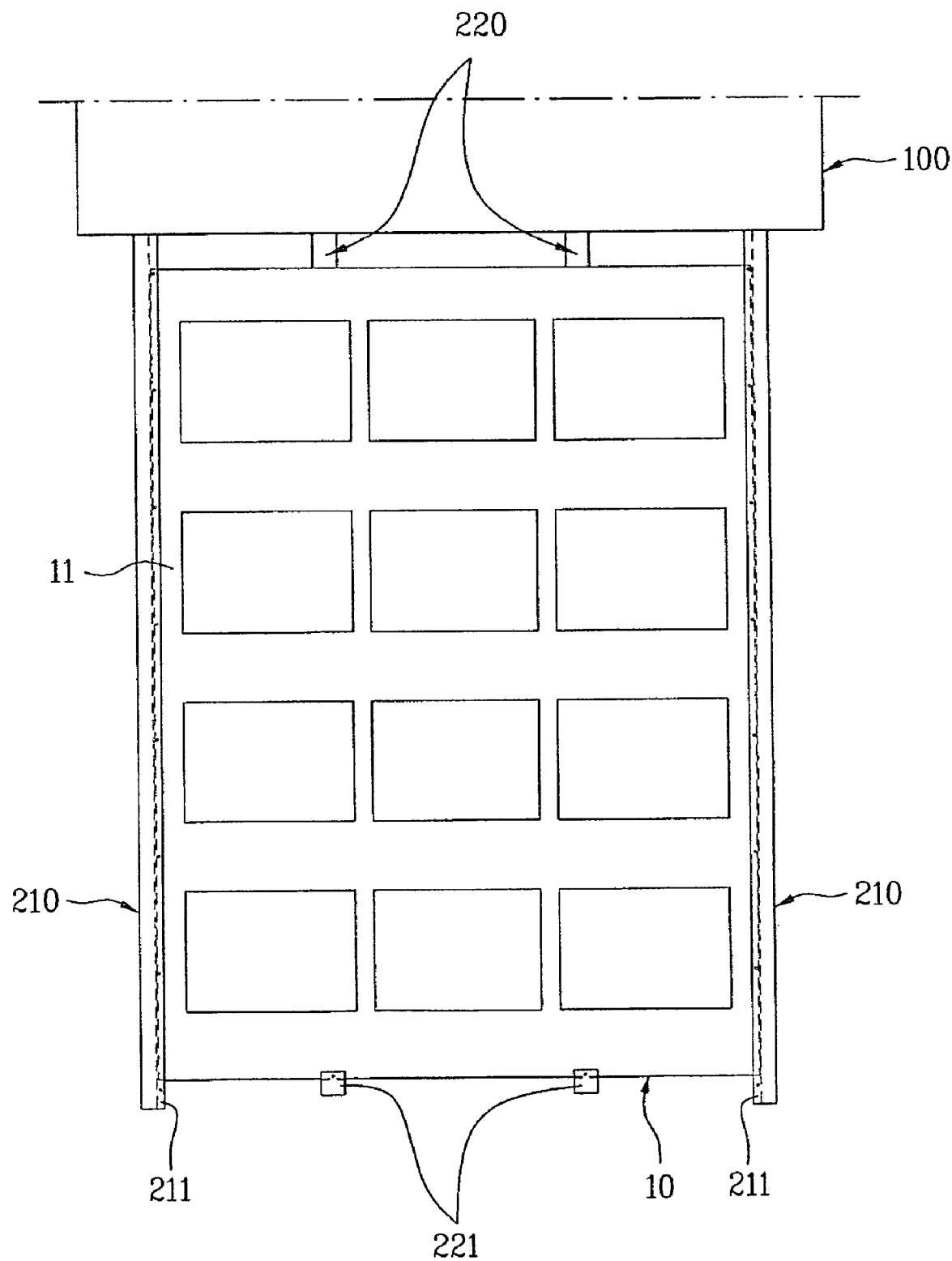
FIGS. 7A to 7C illustrate a plan view, a front sectional view, and a side sectional view of the substrate conveyance device when the substrate conveyance device is holding a substrate in accordance with a first embodiment of the present invention.
Figure 7B:
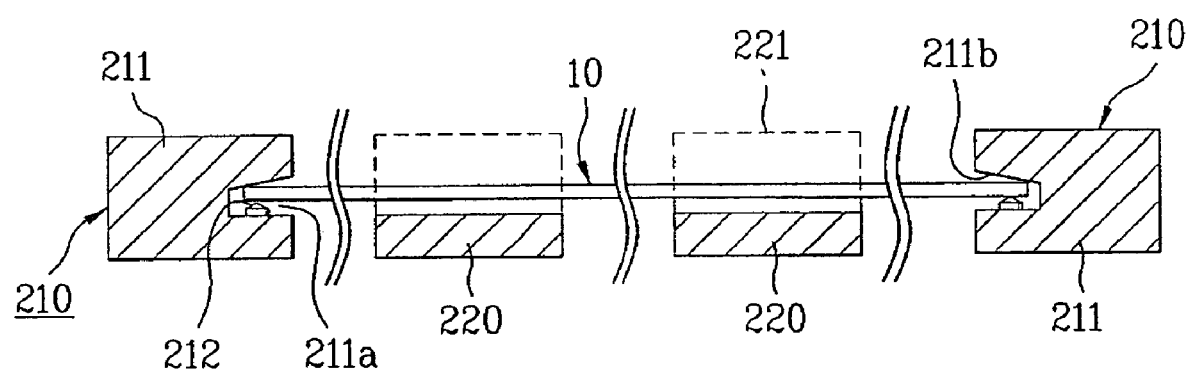
Figure 7C:
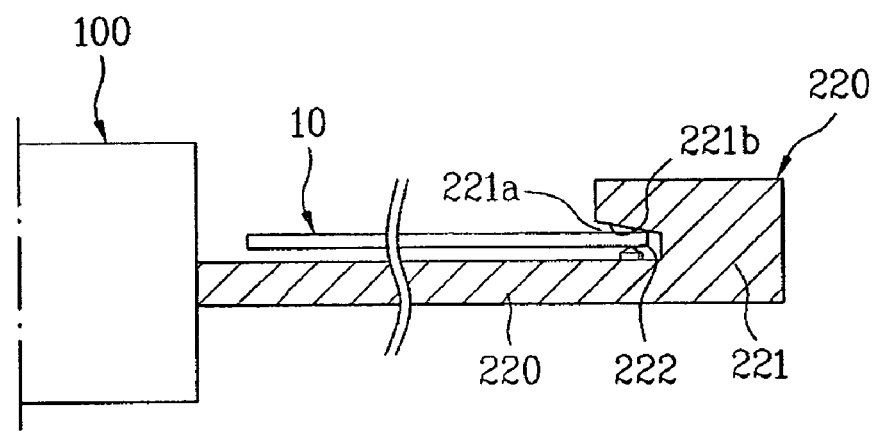

Referring to FIGS. 7A to 7C, when the movers 310 and 320 operate, the dummy portion 11 of the substrate 10 is placed into the slots 211a and 221a of the holders 211 and 221 on the hands 210 and 220.

To further illustrate, referring to FIG. 7B, the actuators 312 of the mover 310 at the two outer hands 210 begin operating and move the two outer hands 210 in a lateral direction guided by the guides 311. The outer hands 210 continue moving until the holders 211 at the hands 210 hold the dummy portion 11 at opposite edges of the substrate 10.

Additionally, referring to FIG. 7C, the actuator 322 of the mover 320 at the inner hands 220 begins operating and moves the inner hand 220 toward the arm 100 of the substrate conveyance device 101. The mover 320 continues moving the inner hand 220 until the holder 221 at the hand 220 holds the dummy portion 11 at a front edge of the substrate 10.

Here, when the substrate 10 is placed in the slots 211a and 221a of the holders 211 and 221, the sloped surfaces 211b and 221b guide the substrate 10.

In this embodiment, the substrate 10 remains aligned when the edges of the substrate 10 are held by the holders 211 and 221. Thus, when the arm 100 operates during fabrication, the substrate 10 remains aligned.

Furthermore, should the substrate conveyance device 101 experience vibration while conveying the substrate 10, the holders 211 and 221 maintain an alignment of the substrate 10.

Accordingly, as the substrate conveyance device 101 maintains an alignment of the substrate 10, the present invention obviates the need for an alignment device which aligns the substrate in a separate step during fabrication.

Figure 8:
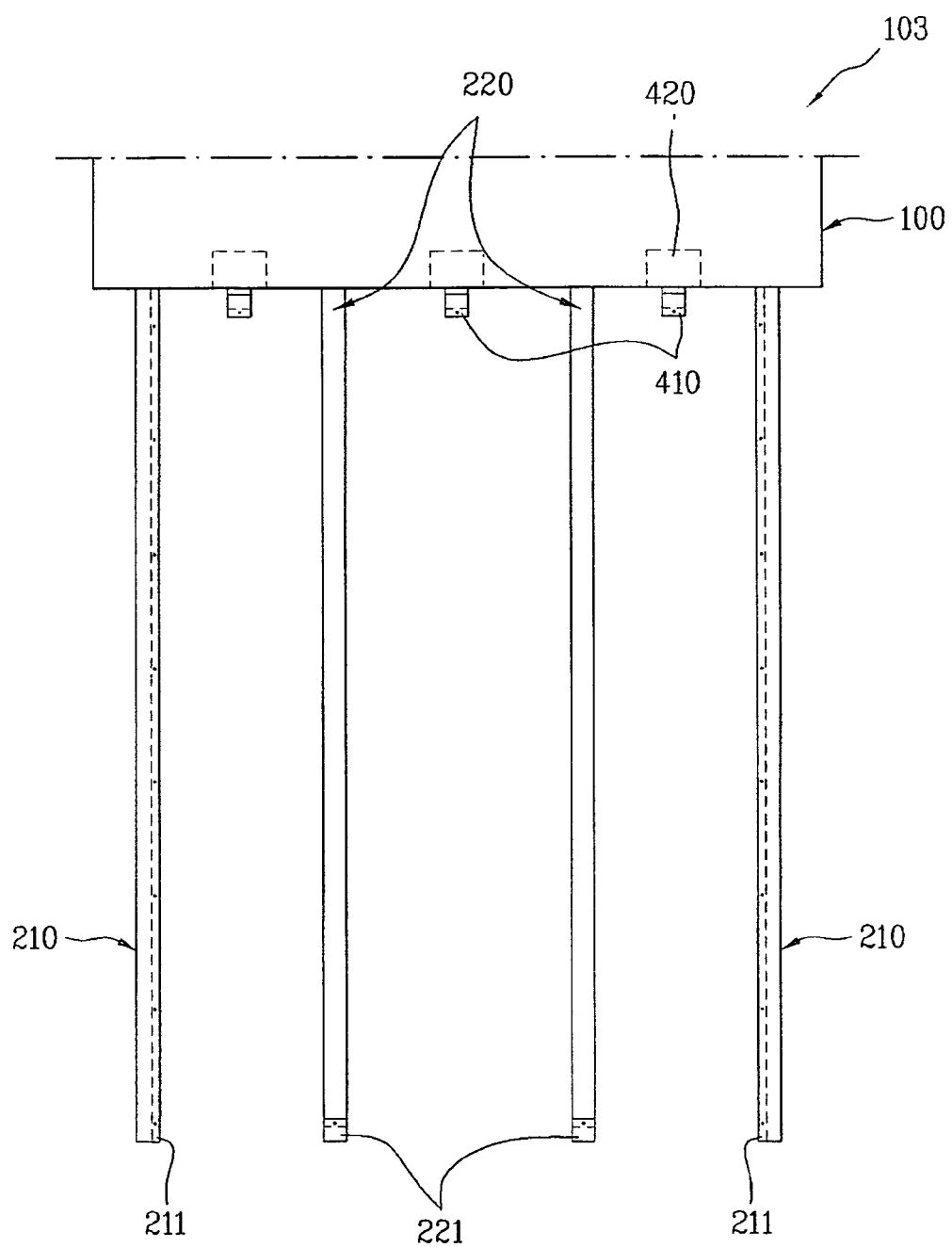
FIG. 8 illustrates a plan view of a substrate conveyance device in accordance with a second embodiment of the present invention.
Figure 9:
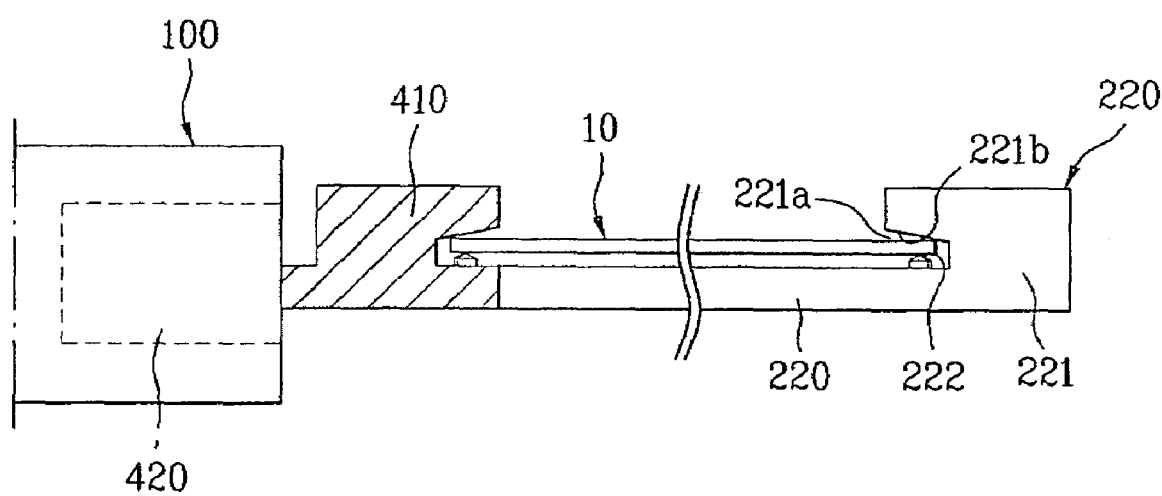
FIG. 9 illustrates a side sectional view of a substrate conveyance device in accordance with a second embodiment of the present invention.

Referring to FIGS. 8 and 9, a substrate conveyance device 103 in accordance with a second embodiment of the present invention includes supplementary holders 410 and supplementary movers 420 that move the supplementary holders 410, in addition to the components in the substrate conveyance device 101 described above in accordance with the first embodiment of the present invention.

In this embodiment, the supplementary holders 410 are disposed adjacent the arm 100. As such, the supplementary holders 410 support the edges of the substrate adjacent the arm 100. In addition, as may be seen in FIG. 8, the supplementary holders 410 are disposed opposite the inner hands 220 and are movable toward a rear edge of the substrate 10.

In accordance with an embodiment of the present invention, the supplementary holders 410 may have shapes opposite to the shapes of the holders 221 at the inner hands 220. In addition, the supplementary holders 410 may have a shape similar to that of the inner hands 220, as clearly seen in FIG. 9.

The supplementary holders 410 may be positioned between the inner holders 220 respectively, such that the supplementary holders 410 do not interfere with the movement of the inner holders 220.

Moreover, the supplementary movers 420 are mounted to the arm 100 in order to move the supplementary holders 410 toward and away from the arm 100. In this embodiment, the supplementary movers 420 have a structure similar to the movers 320 which move the inner holders 220.

The operation of the substrate conveyance device 103 in accordance with a second embodiment of the present invention is similar to the operation of the substrate conveyance device 101 in accordance with the first embodiment of the present invention, except that the supplementary holders 410 hold the dummy portion 11 at the rear edge of the substrate 10 when moved by the supplementary movers 420.

Accordingly, in this embodiment, the substrate 10 is conveyed such that all four edges of the substrate 10 are securely held.

Figure 10:
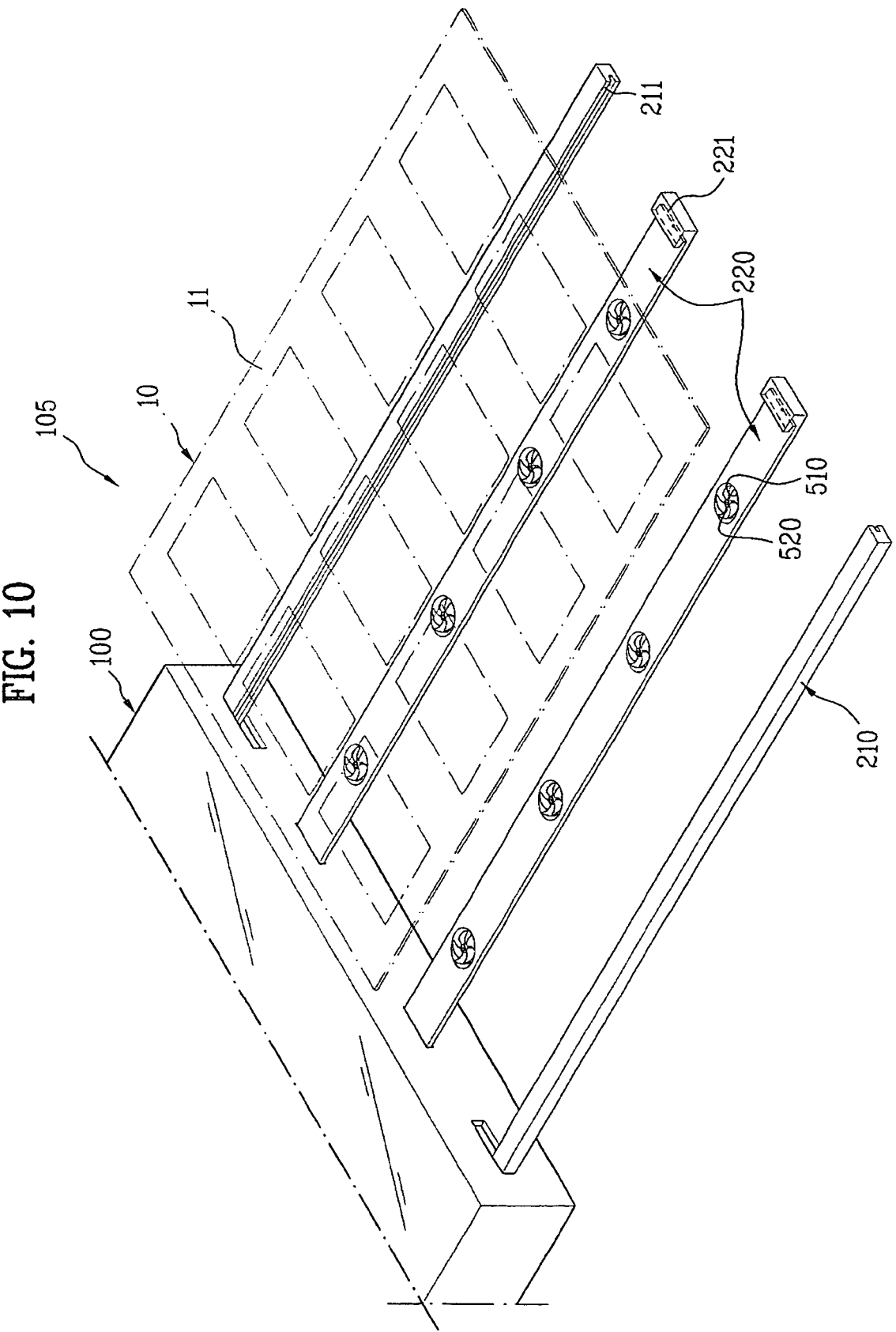
FIG. 10 illustrates a perspective view of a substrate conveyance device in accordance with a third embodiment of the present invention.

FIG. 10 illustrates a perspective view of a substrate conveyance device 105 in accordance with a third embodiment of the present invention.

The substrate conveyance device 105 in accordance with a third embodiment of the present invention includes a cooling unit which cools the substrate 10 while the substrate 10 is conveyed. When the substrate completes a process involving high temperatures, such as curing, the cooling unit of the substrate conveyance device 105 cools substrate 10 while conveying the substrate. Accordingly, as the substrate 10 is cooled, if the substrate is subjected to process using substantially lower temperatures than used in a prior process, deformation which may occur due to the sharp temperature gradients experienced by the substrate may be minimized.

In accordance with an embodiment of the present invention, the hands 210 and 220 may include the cooling unit. Thus, when the substrate is placed on the hands 210 and 220, the substrate 10 is cooled.

The cooling unit includes at least one hole 510 which passes through a surface of each of the hands 210 and 220, and a cooling fan 520 in the hole 510. The cooling fan 520 blows cool air to a lower side of the substrate 10 when it is placed on the hands 210 and 220.

Accordingly, upon putting the cooling fans 520 into operation when the substrate 10 is loaded onto the substrate conveyance device 105, air is drawn into the holes 510 in the inner hands 220 and discharged to the substrate placed on the hands of the substrate conveyance device 105, thereby lowering a temperature of the substrate 10. Furthermore, cool air may be discharged to a substrate on a second substrate conveyance device.

Though not shown, if the cooling units are designed to cool the substrate 10 placed on the hands 210 and 220 in which the cooling units are mounted, the air from the cooling fans 520 is discharged toward the substrate 10 placed on the hands 210 and 220, thereby cooling the substrate 10.

Though the embodiment shows the cooling units provided only to the inner hands 220, a plurality of cooling units may also be provided to the outer hands 210.

It should be noted that a substrate conveyance device for fabricating a liquid crystal display device in accordance with the present invention is not limited to the above embodiments.

For example, though not shown, the holders 211 and 221 may be detachable from the hands 210 and 220. As the opening heights of the holders 211 and 220 may be different depending upon the type of substrate conveyed by the substrate conveyance device, i.e., a single substrate or bonded substrates having different thicknesses, the holders 211 and 221 may be detachable from the hands 210 and 220 to accommodate a thickness variation in the substrates. Thus, if the holders 211 and 221 have a variety of widths, they may be attached to the hands 210 and 220 according to the thickness of the substrate the substrate conveyance device conveys.

Moreover, only one inner hand 220 may be used with a substrate conveyance device according to the present invention. In an embodiment where a single inner hand 220 is used in a substrate conveyance device, the inner hand 220 supports a center of substrate conveyed by the substrate conveyance device.

Furthermore, in accordance with an additional embodiment of the present invention, the movers 310 and 320 may not include the guides 311 and 321 and the actuators 312 and 322. Here, the hands 210 and 220 may include a rack at an end and the movers 310 and 320 may include a pinion which engages with the rack. Further, the movers 310 and 320 may include a motor which rotates the pinion. Alternatively, the movers 310 and 320 may be a linear motor.

As has been described, the substrate conveyance device for fabricating a liquid crystal display device of the present invention has the following advantages.

First, because the substrate conveyance device of the present invention holds the dummy portion of the substrate, damage to components on the substrate is minimized. Second, because the substrate conveyance device of the present invention securely holds the edges of a conveyed substrate, the present invention minimizes the possibility of the substrate shifting while the substrate conveyance device conveys it. Third, the prevention of shifting of the substrate caused during conveyance of the substrate obviates the need to align the substrate with an additional aligning apparatus, thereby reducing fabrication time and costs associated with methods using the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A substrate conveyance device for fabricating a liquid crystal display device comprising:
   an arm that forms a body of the substrate conveyance device;
   a first and second hands, respectively, including a first end coupled with the arm, wherein the first hand is movable in a first direction; an upper surface, wherein a substrate is placed on the upper surface; and a first holder that holds a dummy portion at a front edge of the substrate;
   a first mover configured to move the first and the second hands; and
   a pair of outer hands at opposite outermost positions of the arm for holding dummy portions at opposite edges of the substrate, wherein the pair of outer hands is movable in opposite directions which are vertical to the first direction,
   wherein the first hand and the second hand are disposed between the outer hands;
   wherein the first mover includes:
   a first guide that guides movement of the first hand;
   a first actuator that moves the first hand;
   a second guide that guides movement of the second hand; and
   a second actuator that moves the second hand.

2. The device as claimed in claim 1, wherein the pair of outer hands comprise a second holder including slots for holding dummy portions of the substrate.

3. The device as claimed in claim 1, wherein the pair of outer hands comprise a second holder including bent portions, the bent portions forming a recessed space in the second holders wherein the recessed space holds dummy portions at a front edge of the substrate.

4. The device as claimed in claim 3, wherein a width of the recessed space of the second holder decreases from an outer portion of the second holder toward an inner portion of the second holder.

5. The device as claimed in claim 4, wherein the recessed space includes an upper sloped surface where the upper sloped surface slopes in a downward direction from a front of the second holder toward a rear of the second holder, thereby decreasing the width of the recessed space.

6. The device as claimed in claim 1, wherein the first and second hands are movable toward the arm corresponding to the first directions.

7. The device as claimed in claim 6, wherein the first holder is respectively formed at ends of the first hand and the second hand opposite to the end coupled with the arm, the first holder including slots which form a recessed space, wherein the recessed space holds an edge of the substrate placed thereon.

8. The device as claimed in claim 6, wherein the first holder at the first hand is respectively formed at ends of the first hand and the second hand opposite to a side secured to the arm, the first holder including bent portions, the bent portions forming a recessed space in the first holder wherein the recessed space holds an edge of the substrate.

9. The device as claimed in claim 8, wherein a width of the recessed space of the first holder decreases from an outer portion of the first holder toward an inner portion of the first holder.

10. The device as claimed in claim 9, wherein the recessed space includes an upper sloped surface where the upper sloped surface slopes in a downward direction from a front of the first holder toward a rear of the first holder, thereby decreasing the width of the recessed space.

11. The device as claimed in claim 1, wherein the arm further includes:
    at least one supplementary holder, the at least one supplementary holder being movable toward an edge of the substrate, wherein the supplementary holder holds the edge of the substrate; and
    a supplementary mover that moves the supplementary holder.

12. The device as claimed in claim 1, further comprising a supporting projection on a portion of an upper surface of the first hand and the second hand where the dummy portion of the substrate contacts the supporting projection such that the dummy portion of the substrate is supported by the supporting projection.

13. The device as claimed in claim 1, further comprising a cooling unit disposed at the first hand and the second hand, the cooling unit cooling the substrate placed on the upper surface.

14. The device as claimed in claim 13, wherein cooling unit includes:
    a hole in a surface of the first hand and the second hand; and
    a cooling fan in the hole for blowing air toward a substrate placed on the upper surface of the first hand and the second hand.

* * * * *